(12) United States Patent
Brunsen

(10) Patent No.: US 9,682,407 B2
(45) Date of Patent: Jun. 20, 2017

(54) APPARATUS FOR SINGULATING LOAD ITEMS

(71) Applicant: BEUMER GmbH & Co. KG, Beckum (DE)

(72) Inventor: Hermann Brunsen, Beckum (DE)

(73) Assignee: BEUMER GMBH & CO. KG., Beckum (DE)

( * ) Notice: Subject to any disclaimer, the term of this patent is extended or adjusted under 35 U.S.C. 154(b) by 0 days.

(21) Appl. No.: 14/315,129

(22) Filed: Jun. 25, 2014

(65) Prior Publication Data
US 2015/0001138 A1   Jan. 1, 2015

(30) Foreign Application Priority Data

Jun. 26, 2013   (DE) .................... 20 2013 005 760 U

(51) Int. Cl.
*B07C 5/00*   (2006.01)
*B07C 5/36*   (2006.01)
(Continued)

(52) U.S. Cl.
CPC .................. *B07C 5/36* (2013.01); *B07C 1/04* (2013.01); *B07C 5/02* (2013.01); *B07C 5/3412* (2013.01); *B07C 5/3422* (2013.01); *B65G 47/26* (2013.01)

(58) Field of Classification Search
CPC  B07C 5/02; B07C 5/36; B07C 5/3412; B07C 5/3422; B07C 1/04; B65G 47/26;
(Continued)

(56) References Cited

U.S. PATENT DOCUMENTS

| 8,952,284 B1 * | 2/2015 | Wong .................... B07C 5/3412 |
|   |   | 209/586 |
| 2009/0000996 A1 * | 1/2009 | Stemmle ................. B07C 3/082 |
|   |   | 209/584 |

(Continued)

*Primary Examiner* — Joseph C Rodriguez
*Assistant Examiner* — Kalyanavenkateshware Kumar
(74) *Attorney, Agent, or Firm* — Ganz Pollard, LLC

(57) ABSTRACT

An apparatus for singulating load items, with a group of delivery apparatuses for delivering load items, wherein there is associated with each delivery apparatus a first singulation apparatus for singulating the load items delivered with that delivery apparatus and there is, downstream of the first singulation apparatuses of the group of delivery apparatuses which form a first singulation stage, a second singulation stage for singulating load items not singulated in the first singulation stage, wherein the second singulation stage comprises a second singulation apparatus and a detection system associated with it for detecting load items not singulated by the second singulation apparatus, with, downstream of the second singulation stage a third singulation stage for singulating load items not singulated in the second singulation stage, which consists of manually post-singulating load items not singulated by the second singulation stage or of providing a return unit for returning the non-singulated load items detected by the detection system so that they can run through the second singulation stage again, having a discharge path for discharging load items singulated in the first, second and third singulation stages, wherein there is, downstream of each first singulation apparatus, a separating apparatus for separating singulated and non-singulated load items, with which non-singulated load items can be delivered to the second singulation stage, and singulated load items can be delivered to the discharge path, and there is, downstream of the second singulation stage, a separating apparatus for separating singulated load items, with which non-singulated load items can be delivered to the third (Continued)

Figure 1:
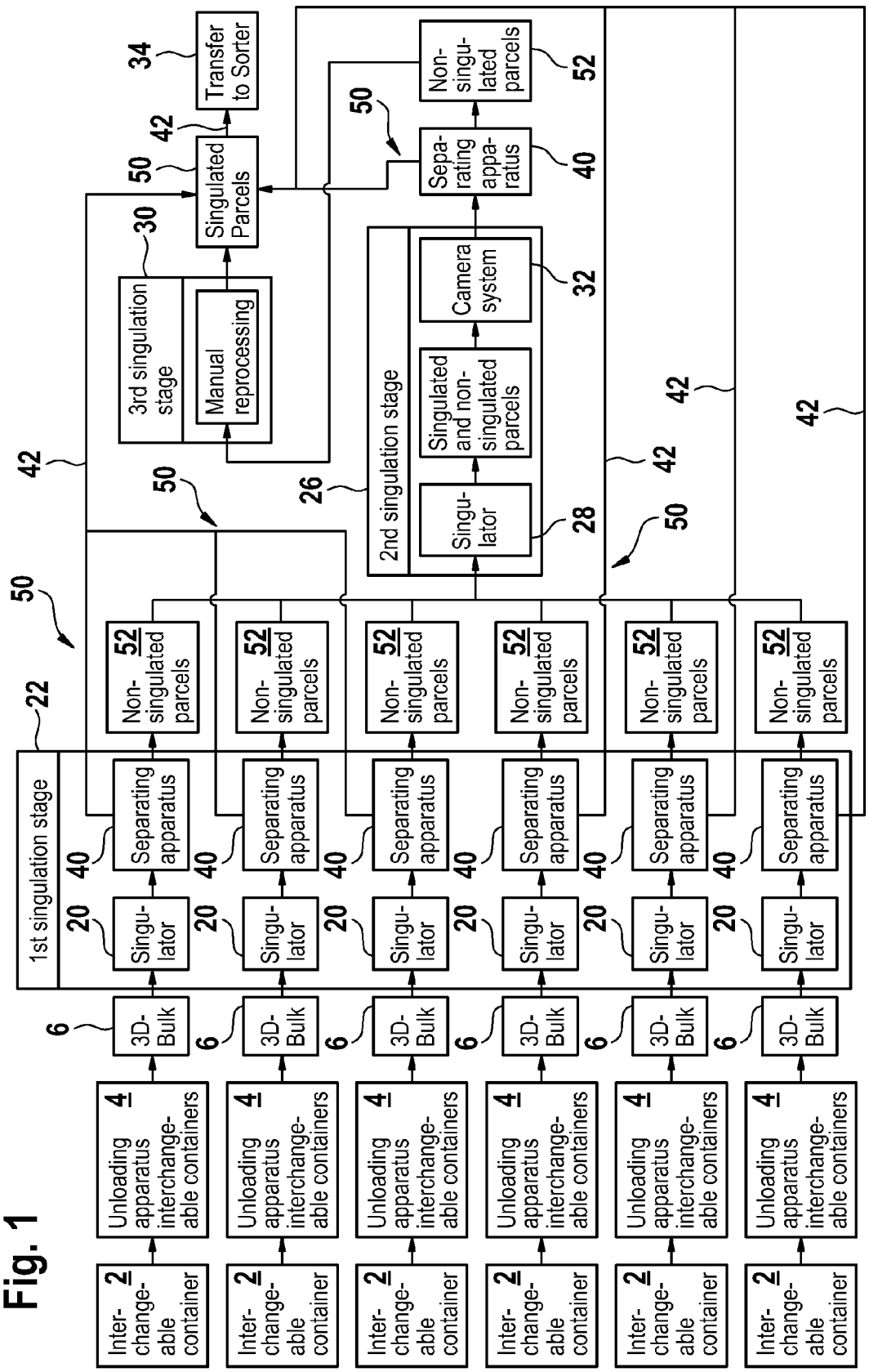

singulation stage and singulated load items can be delivered to the discharge path.

14 Claims, 4 Drawing Sheets

(51) Int. Cl.
*B65G 47/26* (2006.01)
*B07C 5/02* (2006.01)
*B07C 1/04* (2006.01)
*B07C 5/34* (2006.01)
*B07C 5/342* (2006.01)

(58) Field of Classification Search
CPC .... B65G 47/261; B65G 47/265; B65G 47/28; B65G 47/50; B65G 47/503
USPC .................................. 209/552, 555, 577, 606
See application file for complete search history.

(56) References Cited

U.S. PATENT DOCUMENTS

| | | | |
|---|---|---|---|
| 2011/0046775 A1* | 2/2011 | Bailey | B07C 3/00 700/224 |
| 2015/0209831 A1* | 7/2015 | Wargo | B07C 1/02 209/539 |

\* cited by examiner

APPARATUS FOR SINGULATING LOAD ITEMS

The invention relates to an apparatus for singulating load items, comprising a group of delivery lines or means for delivering load items, which may, for example, be delivered in bulk arrangements that may be three-dimensional (arrangement in piles, without order, side by side and on top of one another), two-dimensional (some side by side, others next to one another) or one-dimensional (arranged in a line next to one another or one behind the other), the purpose of the singulation being to arrange the individual load items singly, one behind the other, on a conveyor means, without load items lying on top of one another or directly next to one another, wherein a minimum space, such as 1 cm, 5 cm or 10 cm, should be left between each individual load item and a load item lying closest to it, so that an unambiguous and error-free identification of the identification feature or sorting feature associated with each individual load item is possible, which may, for example, be located on the side or top of the load item in the form of an RFID chip or a barcode.

In connection with unloading parcels from interchangeable containers, an apparatus for singulating parcels is known in which parcels unloaded from interchangeable containers in the form of a three-dimensional bulk parcel stream are successively delivered to a first singulation stage and a second singulation stage. In the first singulation stage, singulation is performed using a powerful and efficient singulation apparatus, which has an average singulation rate of, for example, 99%. The stream of parcels leaving the singulation apparatus, which consists almost exclusively of singulated and to a minor extent of non-singulated parcels, is checked by a camera system and separated into a stream of singulated parcels and a stream of non-singulated parcels by means of a separating apparatus. The non-singulated parcels run through the second singulation stage, which consists either of undergoing a manual reprocessing step or of running through the above-mentioned singulation apparatus a second time. The parcels which have been completely singulated in this way are delivered to a sorting conveyor for sorting and further distribution.

The disadvantage with this known approach is that a relatively large number of complicated singulation apparatuses are required, which are relatively complex in their technical design, corresponding to the number of delivery lines arranged in parallel, in order for those delivery lines and the parcels delivered with them to be processed. Since all the parcels delivered have to pass through the high-performance singulation apparatus, the apparatus has to be adapted appropriately with regard to its maximum throughput.

The problem of the invention consists in improving an apparatus for singulating load items in such a way that, compared to the state of the art, a smaller number of relatively powerful and expensive singulation apparatuses is required, based on a given number of delivery lines.

This problem is solved in accordance with the invention by an apparatus for singulating load items, such as parcels, with a group of delivery apparatuses for delivering load items, wherein there is associated with each delivery apparatus a first singulation apparatus for singulating the load items delivered with that delivery apparatus and there is, downstream of the first singulation apparatuses of the group of delivery apparatuses which form a first singulation stage, a second singulation stage for singulating load items not singulated in the first singulation stage, wherein the second singulation stage comprises a second singulation apparatus and a detection system associated with it for detecting load items not singulated by the second singulation apparatus, with, downstream of the second singulation stage, a third singulation stage for singulating load items not singulated in the second singulation stage, which consists of manually post-singulating load items not singulated by the second singulation stage or returning the non-singulated load items detected by the detection system so that they can run through the second singulation stage again, having a discharge path for removing load items singulated in the first, second and third singulation stages, wherein there is, downstream of each first singulation apparatus, a separating apparatus for separating singulated and non-singulated load items, with which non-singulated load items can be delivered to the second singulation stage, and singulated load items can be delivered to the discharge path, and there is, downstream of the second singulation stage, a separating apparatus for separating singulated load items, with which non-singulated load items can be delivered to the third singulation stage and singulated load items can be delivered to the discharge path.

The first singulation apparatus may exhibit a first average singulation rate and the second singulation apparatus a second average singulation rate, wherein the first average singulation rate may be lower than the second average singulation rate.

The second singulation apparatus may possess a separate, internal control means independent of the camera system in order to vary the processing speed especially as a function of the error rate detected (proportion of faulty singulation results or of non-singulated load items relative to the total number of load items processed). An additional control circuit is formed by the optical detection system, with which the processing speed can be varied as a function of the error rate detected by the optical detection system.

Instead of the known approach, in which the parcels to be singulated are delivered directly to a high-performance singulation apparatus and "errors" by that singulation apparatus are corrected in a second stage, the invention proposes a multi-stage arrangement, in which a number of singulation apparatuses, each of which is comparatively less complex in its technical design and usually also works less accurately, but which on the other hand is relatively inexpensive, are located upstream of a singulation apparatus which is comparatively more complex in its technical design and is usually also more efficient. As the final singulation stage, much as in the state of the art, either manual post-singulation is contemplated, or a further pass through the comparatively more complex singulation apparatus of the second stage.

The delivery apparatuses may each be designed to deliver load items in a one-dimensional, two-dimensional or three-dimensional bulk arrangement.

Each first singulation apparatus is preferably designed as a passive arrangement and does not possess any means to regulate the singulation speed, unlike the state of the art, where the first singulation stage comprises an active, regulated singulation apparatus with detection of faulty singulation results and/or with a means for regulating the processing speed.

It may be contemplated that the second singulation apparatus has open or closed-loop control. In this way, faulty singulation results can be detected and/or a singulation speed of the second singulation apparatus can be adapted to a current singulation rate (number of singulated load items relative to the total number of load items processed over a particular observation period such as no more than 5 s, 10 s, 30 s, 1 min or 5 min) or a current error rate (faulty singulation results or number of incorrectly singulated load items relative to the total number of load items processed over a particular observation period).

The invention preferably contemplates that each first singulation apparatus has a fixed processing speed, which can be set independently of the number of load items delivered per hour.

The first average singulation rate may be between 50% and 90%, especially between 70% and 80%.

It is preferable for all the first singulation apparatuses to be identical and set to a same processing speed.

Each separating apparatus may include a detection apparatus for detecting non-singulated and/or for detecting singulated load items, especially an optical detection apparatus such as a camera system or a light-barrier system.

The second average singulation rate may be at least 80%, especially at least 95%, 98% or 99%.

An average singulation rate is based on an observation period which is at least 10 times as long as the period used for determining a current singulation rate, such as at least 10 min, 30 min, 1 h or several hours.

It may be contemplated that a processing speed of the second singulation apparatus can be regulated depending on a rate of faulty singulation results detected by the detection apparatus, in other words depending on the error rate of the second singulation apparatus. Since the error rate declines as a rule when the processing speed is reduced, it may be contemplated that the processing speed of the second singulation apparatus can be reduced, such as by at least 10%, 20%, 30% or 50%, if it is found that the error rate is increasing. In particular, the processing speed can be reduced proportionately to the error rate.

In addition, a method for singulating load items is described, in which the load items to be singulated are delivered in a group of delivery lines and are in each case delivered to a first singulation station associated with a delivery line, wherein the first singulation stations associated with the group of delivery lines form a first singulation stage, singulation is performed in each first singulation station at a first average singulation rate, and singulated load items are separated from non-singulated load items, the non-singulated load items from the first singulation stage are collected and delivered to a second singulation stage, in which the load items are singulated at a second average singulation rate and singulated load items are separated from non-singulated load items, wherein non-singulated load items are delivered to a third singulation stage, in which the load items are either re-singulated by hand or delivered again to the second singulation stage, and singulated load items from the first, second and third singulation stages are combined.

It is also possible for the first average singulation rate to be lower than the second average singulation rate.

The load items may be processed at a fixed, pre-set speed in each first singulation station, especially at a processing speed which is the same for all the first singulation stations.

It may also be contemplated that the load items are processed at a controlled processing speed in the second singulation stage which depends on a rate of faulty singulated load items (error rate). In particular, it may be contemplated that the load items are processed in the second singulation stage at a processing speed which is slower when the error rate increases, for example at a rate which is reduced in proportion to the error rate.

The apparatus may be equipped with a control means adapted to carry out the method, in order to control the delivery, singulation and separating apparatuses and the detection system.

The invention will now be explained by describing a worked embodiment, reference being made to a drawing, in which FIG. 1 shows a first variant of an apparatus for singulating load items in accordance with the invention.

Figure 2:
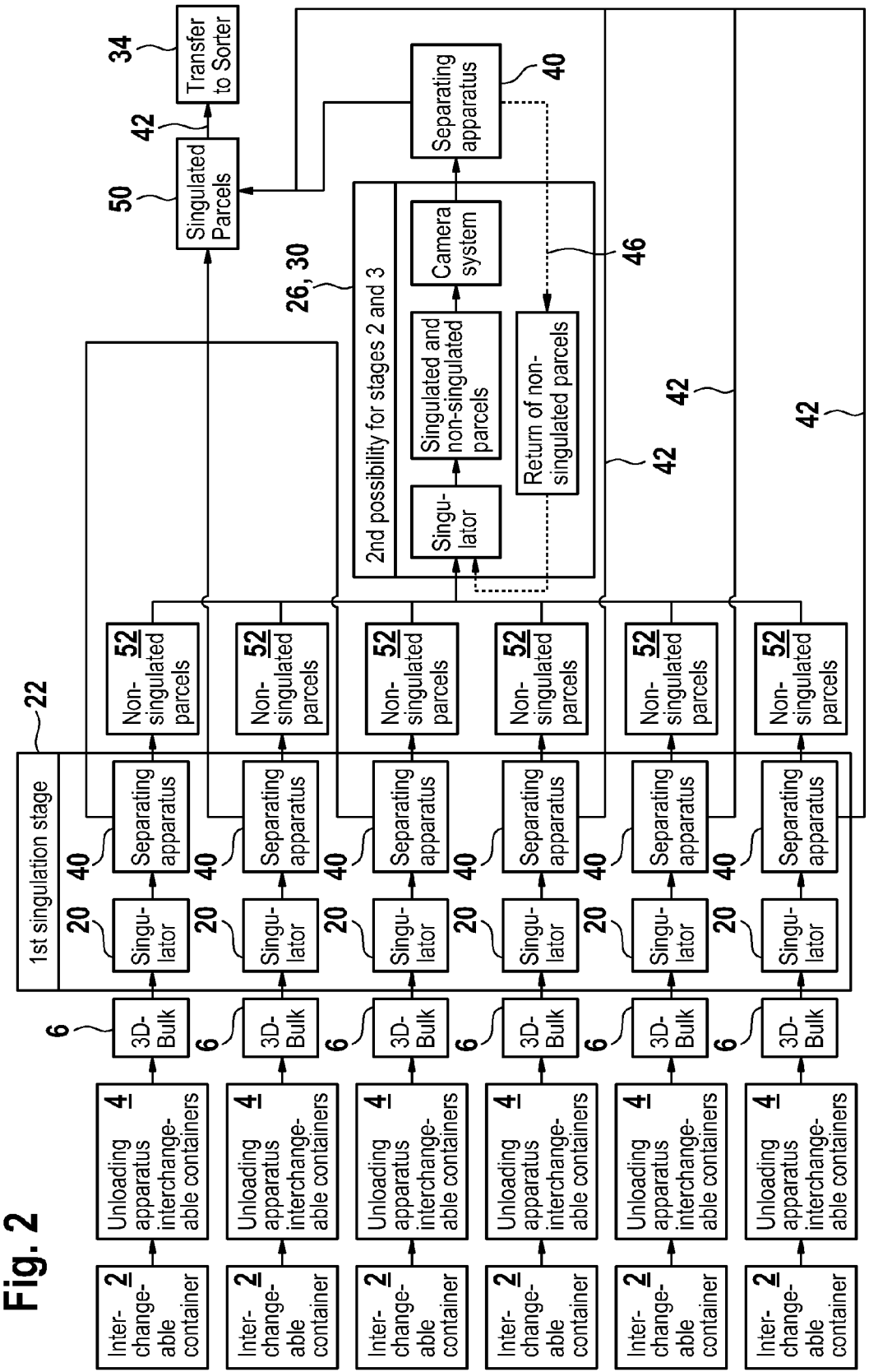

FIG. 2 shows a second variant of an apparatus for singulating load items in accordance with the invention.

Figure 3:
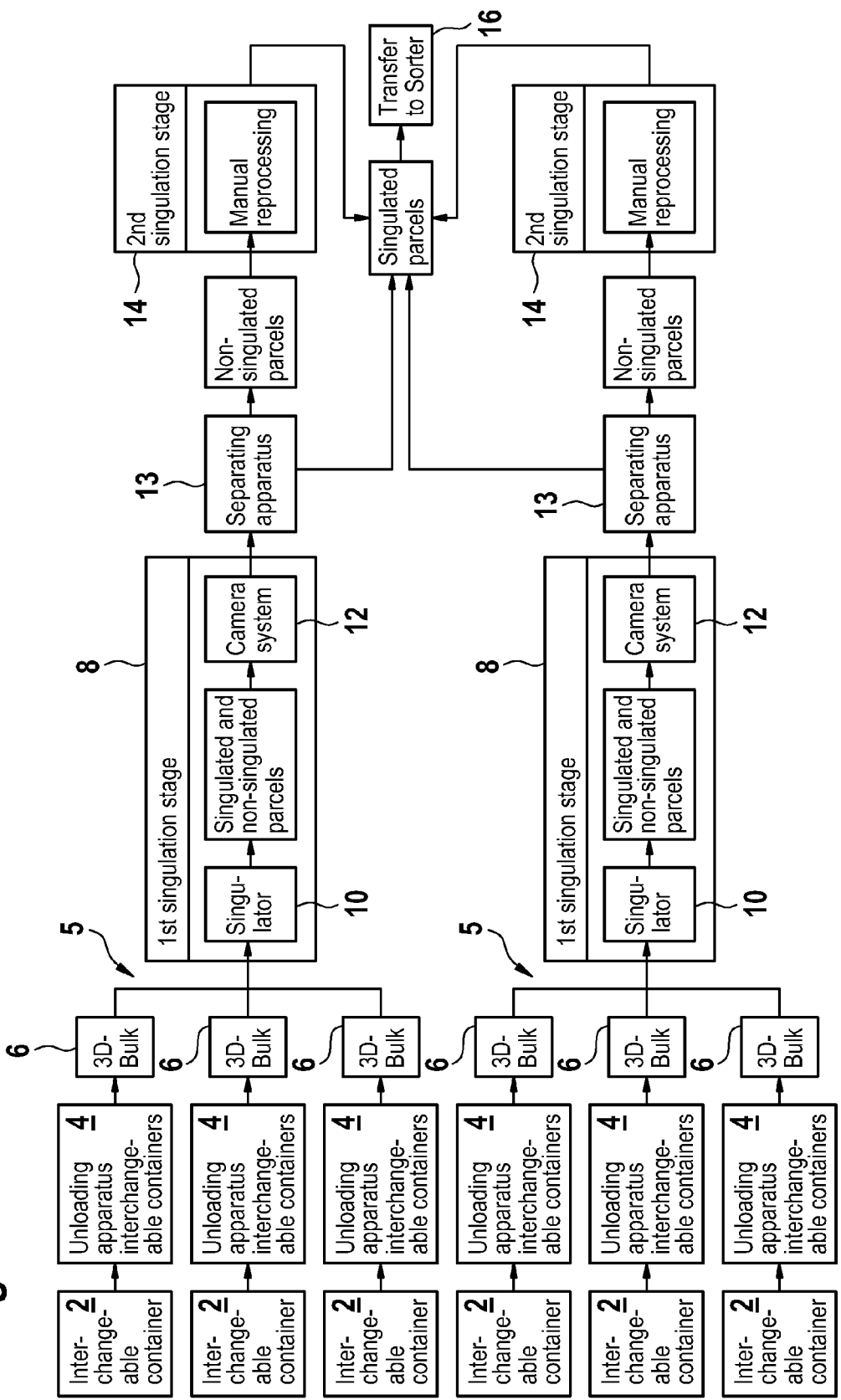
Figure 4:
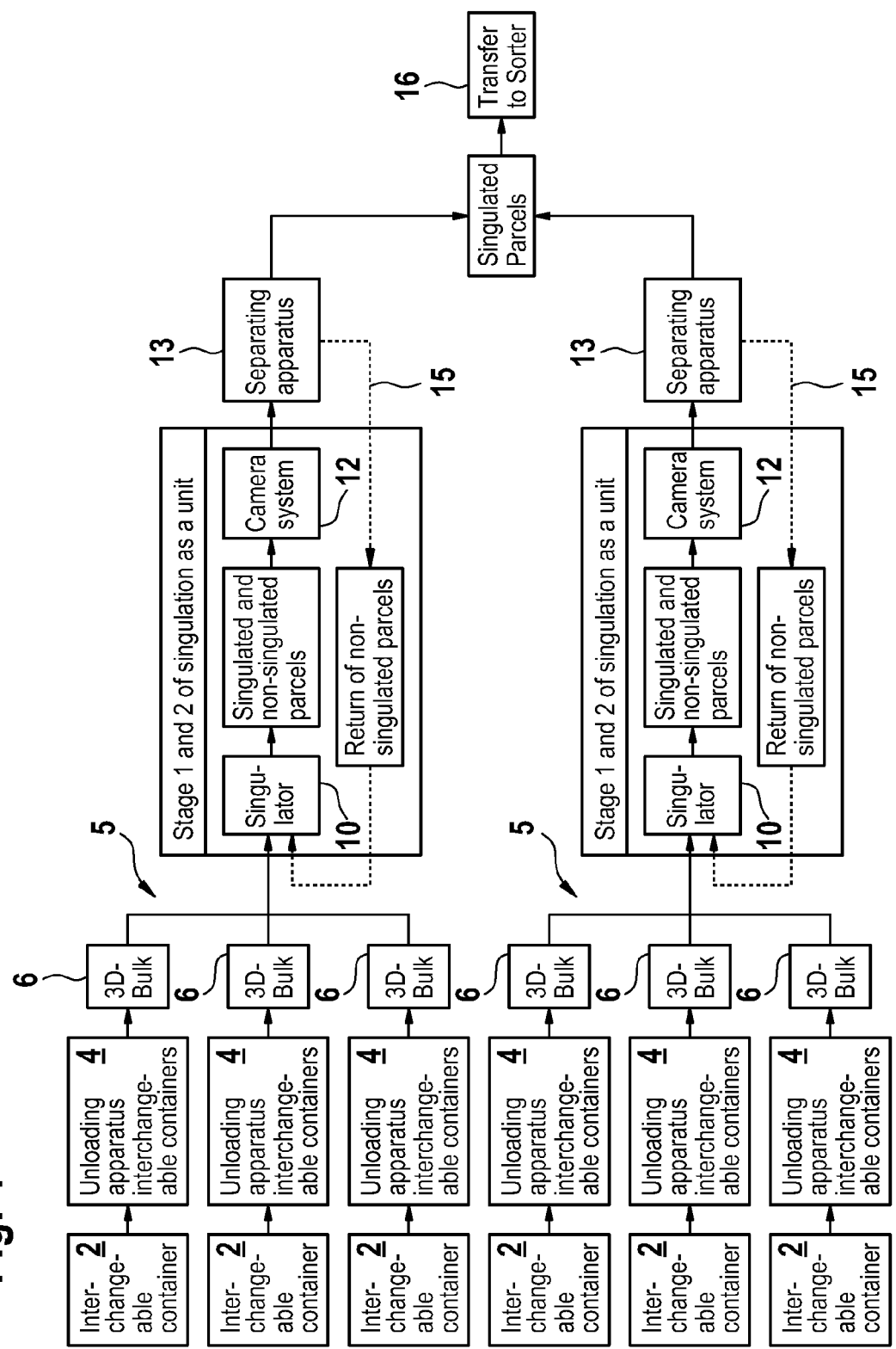

FIGS. 3 and 4 each show a variant of a known apparatus for singulating load items.

Reference will first be made to FIGS. 3 and 4 in order to explain the state of the art.

FIG. 3 is a schematic illustration of a first apparatus for singulating parcels in accordance with the state of the art, wherein, by way of example, the approach in a mail distribution centre is illustrated. Load items in the form of parcels are delivered in interchangeable containers 2, such as by lorry, and are unloaded from the interchangeable containers 2 using a partially or fully automatic unloading apparatus 4, such as by means of a robot with conveying equipment attached. After being unloaded, the parcels are present in the form of bulk material or 3D bulk (arrangement in a pile with parcels lying side by side and on top of one another), and are delivered for singulation by means of delivery apparatuses 6, such as conveyor belts, each of which is associated with one unloading apparatus 4. A number or group 5 of delivery apparatuses 6 in each case lead to a first singulation apparatus 10 or are associated with it: in the example illustrated, there are in each case three delivery apparatuses 6 associated with a first singulation apparatus 10. The first singulation apparatus 10, also referred to as a singulator, forms a first singulation stage 8. All the parcels delivered to the three associated delivery apparatuses 6 pass through the first singulation apparatus 10, after which the vast majority of the parcels have been singulated and only a minor portion remain unsingulated. In the state of the art, the use of singulation apparatuses with a singulation rate of 99% is known, wherein 99% of the parcels are singulated or in other words a portion of 1% of the total number of parcels passing through are not singulated, so that the error rate is 1%. The non-singulated parcels are detected with the aid of a camera system 12 and separated from the singulated parcels by means of a separating apparatus 13 controlled by the camera system and delivered to a second singulation stage 14, in which manual re-processing or post-singulating is performed. The parcels singulated after passing through the second singulation stage 14 are combined with the parcels already singulated after passing through the first singulation stage and are transferred to a sorting apparatus 16 (sorter) downstream. FIG. 3 shows two groups 5 of delivery apparatuses 6, each with three delivery apparatuses 6, wherein each group 5 is associated with a first and a second singulation stage, and both groups are associated with one sorting apparatus 16.

FIG. 4 illustrates a further approach known from the state of the art, which differs from the one shown in FIG. 3 merely in that the first singulation stage and the second singulation stage are not separate from one another, but are designed as a single unit. The parcels which have not been singulated after passing through the singulation apparatus 10 are detected by the camera system 12 and, in contrast to the arrangement in FIG. 3, are not re-singulated manually, but are instead returned via a return unit 15 and fed through the singulation apparatus 10 again. Although one further pass through the singulation apparatus 10 is as a rule sufficient to singulate all the initially non-singulated parcels, it cannot be ruled out that odd groups of parcels will need to go through the singulation apparatus 10 more than twice until they have been singulated. In this case too, a singulation rate of the singulation apparatus 10 is, for example, 99%, so that on average about 1% of all parcels are separated out with the aid of the camera system 12 and are fed through the singulation apparatus 10 again.

FIG. 1 illustrates the invention with reference to the unloading of interchangeable containers 2 in accordance with FIGS. 3 and 4. In contrast to the state of the art, it is contemplated that each individual delivery apparatus 6 (delivery line) is associated with a first singulation apparatus 20 (first singulation station), wherein a predetermined number or a particular group of first singulation apparatuses 20 (six in the example illustrated) together with respective separating apparatuses 40 form a first singulation stage 22. Downstream of each first singulation apparatus 20 there is a separating apparatus 40, which feeds singulated load items 50 to a discharge path 42 and non-singulated load items 52 to a second singulation stage 26, in which a single second singulation apparatus 28 and a detection apparatus 32 for detecting non-singulated load items or parcels is arranged. Non-singulated parcels are separated from the singulated parcels by a separating apparatus 40. Downstream of the second singulation stage 26, there is a third singulation stage 30, with which the parcels which have not been singulated after passing through the second singulation stage 26 are singulated. After the separating apparatus 40, singulated parcels land on a discharge path 42 and are combined at 44 with the separated parcels which had already been singulated after the first singulation stage 22.

FIG. 1 illustrates a first variant for designing the third singulation stage 30. Here, it may be contemplated that the parcels not singulated after passing through the second singulation stage 26 are separated from the singulated parcels and are re-processed, or re-singulated, manually. FIG. 2 illustrates a variant in which the parcels not singulated after passing through the second singulation apparatus 28 are detected by the detection apparatus 32, separated from the singulated parcels by means of a separating apparatus 40 and fed through the second singulation apparatus 28 again by means of a return unit 46. As with the approach described above in connection with the state of the art, it may occasionally happen that non-singulated parcels are fed through the second singulation apparatus 28 more than twice.

The parcels which have been singulated in this way are combined on the respective discharge paths 42 and transferred to a sorting apparatus 34 (sorter) for further sorting and distribution.

It is preferably contemplated in accordance with the invention that the first singulation apparatuses 20 exhibit a first average singulation rate which is lower than a second average singulation rate of the second singulation apparatus 28. The first average singulation rate may, for example, be between 70% and 80%, while the second average singulation rate is preferably substantially higher, such as 90%, 95% or 99%.

The first singulation apparatuses 20 are preferably passive arrangements with no adjustment of the singulation rate or the processing speed. This makes it possible for the first singulation apparatuses 20 to be provided at relatively low cost and with a low likelihood of failure.

In contrast to this, the second singulation apparatus 28 is preferably an arrangement with open or closed-loop control, wherein the second singulation apparatus 28 per se can already be provided with a suitable detection apparatus for faulty singulation results, in addition to the camera system 32, which can form a further regulation or a further return or control loop. The form of the regulation may, for example, be that if a current error rate of the second singulation apparatus increases, its processing speed is reduced.

One advantage of the invention is that not all the singulated and non-singulated parcels enter the second singulation stage, but rather, thanks to the separating apparatuses of the first stage upstream, only the non-singulated parcels do so, as a result of which it becomes possible to adapt the second singulation apparatus used in the second singulation stage to comparatively low processing speeds, so that less effort is involved in design, and the costs and error rate are reduced.

The invention claimed is:

1. An apparatus for singulating load items, with a group of delivery apparatuses for delivering load items, wherein
there is associated with each delivery apparatus a first singulation apparatus for singulating the load items delivered with that delivery apparatus and
there is, downstream of the first singulation apparatuses of the group of delivery apparatuses which form a first singulation stage, a second singulation stage for singulating load items not singulated in the first singulation stage,
wherein the second singulation stage comprises a second singulation apparatus and a detection system associated with it for detecting load items not singulated by the second singulation apparatus,
with, downstream of the second singulation stage, a third singulation stage for singulating load items not singulated in the second singulation stage, comprising a station where a third singulation of load items not singulated by the second singulation stage occurs, the third singulation stage being the same or different from the first singulation stage or the second singulation stage,
a discharge path for discharging load items singulated in the first, second and third singulation stages,
wherein there is, downstream of the first singulation apparatus, a separating apparatus for separating singulated and non-singulated load items, with which non-singulated load items can be delivered to the second singulation stage, and singulated load items can be delivered to the discharge path, and
there is, downstream of the second singulation stage, a separating apparatus for separating singulated load items, with which non-singulated load items can be delivered to the third singulation stage and singulated load items can be delivered to the discharge path.

2. The apparatus of claim 1, wherein the first singulation apparatus exhibits a first average singulation rate and the second singulation apparatus exhibits a second average singulation rate, wherein the first average singulation rate is slower than the second average singulation rate.

3. The apparatus of claim 1, wherein each first singulation apparatus is designed with no means to regulate a singulation speed.

4. The apparatus of claim 1, wherein the second singulation apparatus has open or closed-loop control.

5. The apparatus of claim 1, wherein each first singulation apparatus has a fixed processing speed.

6. The apparatus of claim 1, wherein the first average singulation rate is between 50% and 90%, especially between 70% and 80%.

7. The apparatus of claim 1, wherein all the first singulation apparatuses are identical and can be set to a same processing speed.

8. The apparatus of claim 1, wherein each separating apparatus has a detection apparatus for detecting non-singulated load items, espically with a camera system or a light-barrier system.

9. The apparatus of claim 1, wherein the second average singulation rate is at least 80%, especially at least 95%, 98% or 99%.

10. The apparatus of claim 1, wherein a processing speed of the second singulation apparatus can be adjusted depending on a rate of faulty singulation results detected by the detection apparatus.

11. The apparatus of claim 10, wherein the processing speed of the second singulation apparatus can be reduced if the error rate increases.

12. The apparatus of claim 1, wherein there is a sorting apparatus downstream of the discharge path.

13. The apparatus of claim 1, wherein the apparatus possesses a plurality of groups of delivery apparatuses, each with first, second and third singulation stages associated with it, wherein the discharge paths of all the groups are combined and have a sorting apparatus disposed downstream of them, into which all the load items of all the delivery apparatuses can be transferred in singulated form.

14. The apparatus of claim 1, wherein the third stage comprises a return unit for returning the non-singulated load items detected by the detection system so that they can run through the second stage again.

\* \* \* \* \*